Sept. 6, 1966   L. C. KLEIST   3,270,599
FILM CUTTER WITH PHOTOCELL INSPECTION AND STOP MEANS
Filed Sept. 24, 1963   4 Sheets-Sheet 1

INVENTOR.
Leroy C. Kleist

By Smyth, Roston & Pavitt
Attorneys

Sept. 6, 1966 L. C. KLEIST 3,270,599
FILM CUTTER WITH PHOTOCELL INSPECTION AND STOP MEANS
Filed Sept. 24, 1963 4 Sheets-Sheet 3

INVENTOR:
Leroy C. Kleist
By Smyth, Roston & Pavitt
Attorneys

Sept. 6, 1966 L. C. KLEIST 3,270,599
FILM CUTTER WITH PHOTOCELL INSPECTION AND STOP MEANS
Filed Sept. 24, 1963 4 Sheets-Sheet 4

INVENTOR:
Leroy C. Kleist

By Smyth, Roston & Pavitt
Attorneys

United States Patent Office 3,270,599
Patented Sept. 6, 1966

3,270,599
FILM CUTTER WITH PHOTOCELL INSPECTION AND STOP MEANS
Leroy C. Kleist, Ogden, Ill., assignor to The Magnavox Company, Fort Wayne, Ind., a corporation of Delaware
Filed Sept. 24, 1963, Ser. No. 311,020
16 Claims. (Cl. 83—63)

The present invention relates to a means for cutting a continuous strip into a plurality of film cards which may be employed as a storage medium for use in a data processing mechanism. More particularly the invention relates to a means for continuously inspecting the film as the cards are being cut therefrom and to prevent the cutting of cards that may be defective.

One method of filing documentary information involves the use of photography to record graphic and/or printed information in greatly reduced form on tiny pieces of film or film cards. In addition to containing the documentary information each of the film cards are marked with machine readable coding relating to the documentary information contained on the card. This will facilitate the mechanical processing of the cards in order to retrieve and/or use the documentary information contained upon the cards. To produce the film cards, a continuous strip of film may be placed in a camera which is focused onto a target area and the frames of the film are successively exposed to the documentary information coding as they are placed on the target area. After the entire film has been properly exposed and developed it may be fed through a film cutting machine such as described and claimed in copending application, Serial Number 141,875, now abandoned, filed September 29, 1961, in the name of Leroy C. Kleist and assigned of record to The Magnavox Company.

In a film cutter of this nature a film transport mechanism intermittently steps the film through a film cutter. Each time the film is momentarily stopped the film cutter cuts a frame from the strip to form the card. Simultaneously with the cutting operation the card is inserted into a storage capsule. The capsules are thus effective to accumulate a stack of the film cards without ever being manually handled. The capsules are particularly adapted to store the cards for future use in data processing equipment. Although these machines are well suited for this purpose it has been found that since entire cutting and stacking operation is entirely automatic and the cards are not manually handled if one or more frames on the film are not properly exposed it may be accumulated in the stack of stored cards. Furthermore, it has been found that when operating a machine of this type it is frequently difficult to limit the number of cards in a capsule to a particular maximum number or to group the cards so that all of the cards within a capsule are related in some manner.

It is now proposed to provide a film cutting and stacking machine for automatically cutting a continuous strip of film into a plurality of film cards and stacking the cards in suitable storage capsules without the foregoing difficulties. More particularly it is proposed to provide a film cutter and stacker which will be effective to inspect the various frames of the film as it passes through the machine and to stop the machine in the event of a defective frame. This will be effective to prevent the machine placing defective film cards in the storage capsules. Also by deliberately producing a defective frame in the film at the end of the group of cards to go into a particular capsule the machine will automatically stop when the group has been cut and stacked.

These and other features and advantages of the present invention will become readily apparent from the following detailed descrpition of one operative embodiment thereof, particularly taken in connection with the accompanying drawings wherein like reference numbers refer to like parts and wherein.

Referring to the drawings in more detail the present invention is particularly adapted to be embodied in a machine 10 for receiving a reel 12 containing a strip 14 of film and cutting the film into a series of cards 16 of substantially identical size and shape.

Although this film may be of any desired variety, and may contain any desired type of information, in the present instance the film strip 14 includes a series of frames 18 separated from each other by a series of substantially uniformly spaced apertures or openings 20. The present openings 20 are relatively long and narrow and extend transversely across the film strip 14.

Each of the frames 18 includes a document section 22 and a data processing section 24. The document section 22 is adapted to have photographic images of a document such as a letter, drawing, etc., contained therein. To increase the capacity to store information it is desirable for the document section 22 to have several document areas 26a, 26b and 26c with each area 26 containing a photographic reproduction on a greatly reduced scale of a separate document. The data processing section 24 may include a plurality of photographic images that are machine readable and relate to the documentary material contained in the juxtaposed document section 22. This arrangement will be effective to permit a machine to make a search through the cards 16, based on the data processing section in order to retrieve the documentary material contained in the documentary section 22.

In order to expose the frames 18 of the film strip 14, a camera may be provided that employs a long strip of unexposed film. The camera is focused on a target-area where the various documents and data processing information are successively placed. The various frames 18 of the film strip 14 are in turn successively exposed. After the entire film strip 14 has been exposed it may be removed from the camera and developed to bring out the latent images which have been exposed on the various frames 18. The resultant strip 14 of film may then be wound onto the reel 12.

In order to utilize the developed film it is desirable that it be cut into a plurality of chips or film cards 16 with each card 16 containing a single frame 18. In order to accomplish this the container strip 14 of film may be fed through the machine 10 wherein it will be simultaneously cut into a plurality of substantially identical cards 16 and will stack the cards 16 into stacks of predetermined size.

The present machine or film cutter 10 includes a front panel 28 which may be substantially vertical and exposed so as to be readily accessible to the operator. A spindle 30 is provided that projects outwardly from the panel 28 for receiving the reel 12 of the strip of exposed and developed film. This spindle 30 is not driven but is effective to allow the reel 12 to rotate about its axis while the film 14 is being stripped therefrom. In addition, the panel 28 has on its front side a film transport mechanism 32 which includes a sprocket 34 for removing the film 14 from the reel 12, a cutter mechanism 36 for cutting the film 14 into film cards 16 as it passes from the film transport 32, a magazine 38 for receiving and stacking the cards 16 after they have been cut, and a section 40 having the controls for controlling the operation of the machine 10.

Figure 3:
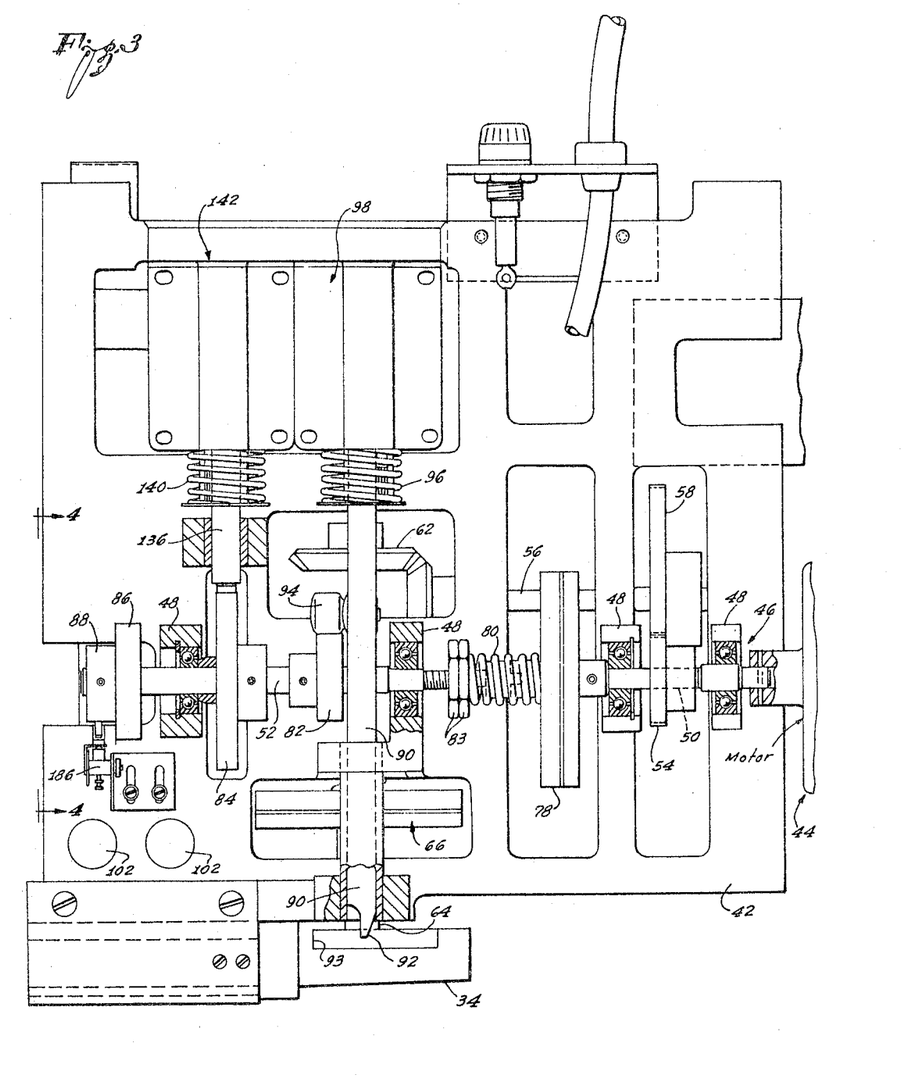
FIGURE 3 is a bottom plan view of the drive mechanism of the film cutter and stacker of FIGURE 1.
Figure 4:
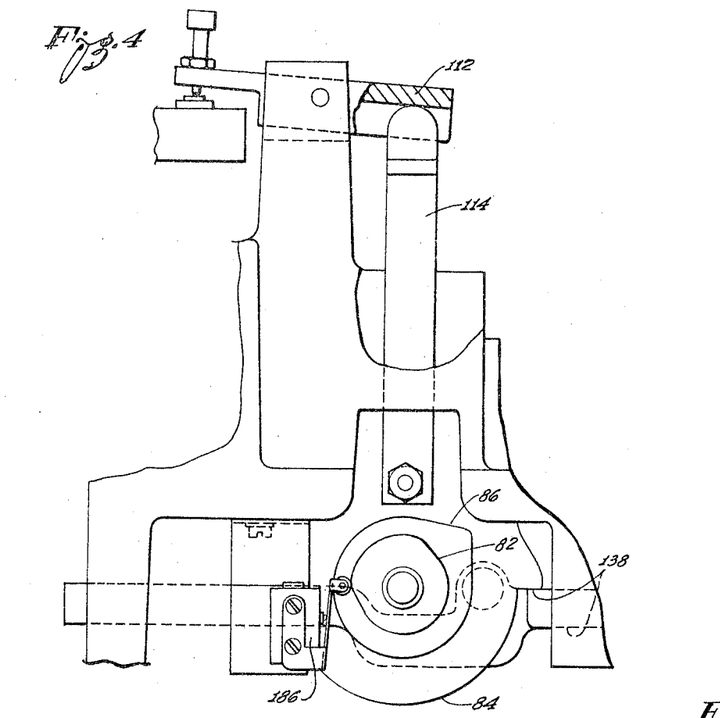
FIGURE 4 is an end view of the drive mechanism of FIGURE 3 taken substantially along the plane of line 4—4 therein.
Figure 5:
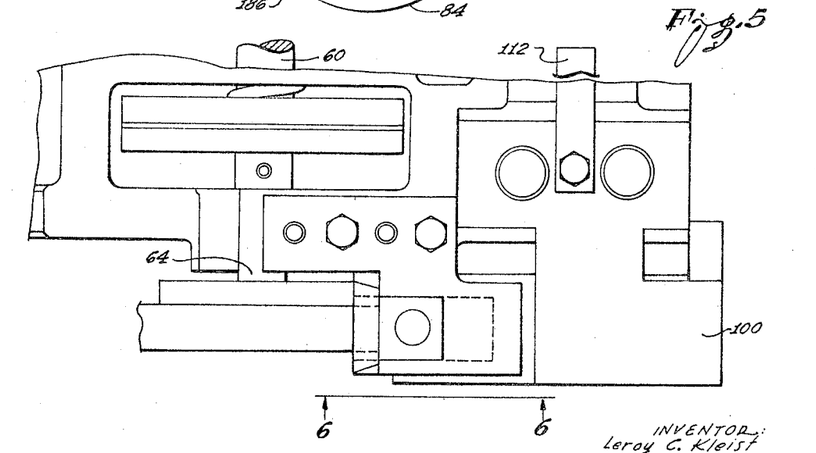
FIGURE 5 is a fragmentary top view of one portion of the drive mechanism of FIGURE 3.
Figure 6:
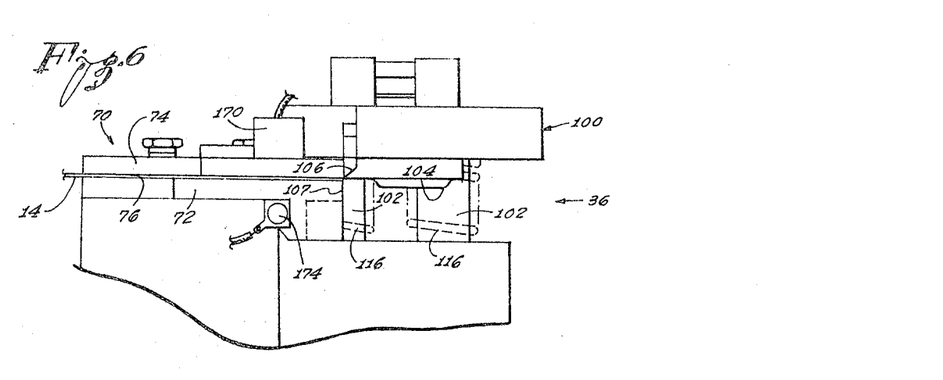
FIGURE 6 is a fragmentary front view on an enlarged scale, of a portion of the cutting mechanism.

A base plate or mounting frame 42 may be secured to the back of the panel 28 so as to be substantially normal to the plane of the panel 28. As seen in FIGURE 3, which is a bottom view, the various drive means for operating the various portions of the machine 10 are mounted on this frame 42. A drive motor/speed-reducing gear train 44 may be secured to one end of the frame 42. The motor/gear train 44 is effective to supply all of the power for driving the various sections of the machine or film cutter 10 and will normally run continuously when the film cutter 10 is turned on, even though the various sections of the cutter 10 are not operating.

The drive or output shaft from the motor/gear train 44 is directly connected to a drive shaft assembly 46 that is mounted on the frame 42 so as to extend completely thereacross. This drive shaft assembly 46 is rotatably mounted in a plurality of bearings 48 such as the roller bearings. This drive shaft assembly 46 includes a film transport or sprocket drive take-off shaft 50 and a cutter shaft 52. The sprocket drive take-off shaft 50 is directly and positively connected to the motor 49. Thus, this shaft 50 will always rotate whenever the motor 49 is rotating. This shaft 50 includes a spur gear 54 that is keyed or locked thereto. A first auxiliary or sprocket drive shaft 56 may be mounted on the side of the frame opposite to the shaft assembly. A spur gear 58 is keyed to the auxiliary shaft 46 and is positioned to mesh with the first spur gear 54.

A second auxiliary or sprocket drive shaft 60 is rotatably mounted on the frame 42 at substantially right angles to the first shaft 56. A pair of intermeshing bevel gears 62 are provided on the adjacent ends of the two shafts 56 and 60 to drivingly connect them together. A final shaft 64 may be rotatably mounted in substantial alignment with the shaft 60. The adjacent ends of these two shafts 60 and 62 are connected together by means of a slipping clutch 66. The slipping clutch 66 includes a pair of mating discs with a layer of friction material therebetween. This clutch 66 is adjusted so that it will transmit an adequate torque to the sprocket 34 for transporting the film. However, the clutch 66 will slip and permit the sprocket 34 to stall without stalling or overloading the motor 44. The opposite end of the shaft 64 projects through the front panel 28. The sprocket 34 may be secured to the end of this shaft 64 or on hub thereon by any suitable fastening means such as a pair of bolts so that it will rotate with the shaft 64.

The sprocket 34 will thus be disposed on the outside of the front panel 28 substantially parallel to the plane of the panel 28. Also the sprocket 34 is disposed in substantially the same plane as the supply reel 12. The sprocket 34 may have a substantially cylindrical exterior that is approximately the same width as the supply reel 12. The diameter of the sprocket 34 is preferably sufficiently large to permit the film strip 14 to be bent thereover without damaging the film.

The sprocket 34 may include a plurality of spokes or teeth 68 that extend radially outwardly from the cylindrical exterior of the sprocket 34 a distance approximately equal to the thickness of the film. The circumferential distance between these spokes 68 is approximately the same as the distance between the openings 20 through the film strips. That is, the space between the spokes 68 will be equal to the length of a frame 18 and the length of a card 16. It will thus be seen that as the sprocket 34 rotates the spokes 68 will pass through the successive openings 20 in the film and drive the film thereacross. In addition to providing a positive drive the coaction of the spokes 68 and the openings 20 will be effective to synchronize the positions of the various sections 24 and 26 of the frames 18 in relation to the position of the sprocket 34.

It may thus be seen that if the drive motor 44 is running the spur gear 54 will continuously transfer power to auxiliary shafts 56 and to the slipping clutch 66. In the event this clutch 66 does not slip and a film is attached to the sprocket 34, the sprocket 34 will rotate and carry the film 14 from the reel 12 and across the sprocket 34. In the event a substantial braking force is applied to the sprocket 34, the slipping clutch 66 will be incapable of transferring a sufficient torque to the sprocket 34. As a consequence, the clutch 66 will slip and the sprocket 34 will not turn, although the motor 44 may continue to run. This in turn will prevent any further film 14 being removed from the supply reel 12 and travelling across the sprocket 34.

The film transport 32 may include a film guide 70 and may be disposed adjacent the sprocket 34 to receive the film 14 as it comes off the wheel. In the present instance this guide includes a lower member 72 and an upper member 74 that are arranged to form a relatively thin passage 76 through which the film 14 may slide.

The second shaft 52 of the drive shaft assembly 46 is disposed in substantial alignment with the film transport or sprocket drive take off shaft 50. The adjacent ends of the shafts 50 and 52 are secured together by a slipping clutch 78 that is substantially identical to the first slipping clutch 66. It includes a pair of discs that are juxtaposed to each other. A layer of friction material is disposed between the adjacent faces of these members so as to transmit torque therebetween. In order to control the compression of the layer and, therefore, the amount of torque that can be transferred, a spring 80 may act against one of the plates. A pair of jam nuts 82 may be adjusted so as to control the tension in the spring 80. This tension is adjusted so as to insure the transmission of a sufficient torque to drive the mechanism during the normal cutting operations. However, the clutch 78 is set so as to slip when these normal torques are exceeded. The amount of torque to cause slipping is such as to permit the clutch 78 to continuously slip for extended periods of time without in any way damaging the clutch or overloading the motor 44.

The secondary shaft 52 includes a cam 82 which is effective to control the operation of the drive sprocket 34, a stop cam 84 which is effective to control the operation of the cutter mechanism, a cutter cam 86 which is effective to drive the cutter, and finally a switch cam 88 which is effective to mechanically activate a control switch.

The sprocket cam 82 is effective to control the rotation of the sprocket 34 by means which are effective to block, the sprocket 34 and prevent its rotation. Although the motor 44 may continue to drive the auxiliary shaft 60, the slipping clutch 66 will permit the sprocket 34 to be retained in a fixed position without damaging the motor 44, etc. In the present instance this is accomplished by means of a probe 90 slidably mounted in a bushing that is set in the mounting frame 42.

The outer end of the probe 90 is positioned adjacent the sprocket 34 and extends from the front panel 28. It has been found desirable for the end of the probe 90 to include a finger 92 to provide a flat face. When in the retracted position, this finger 92 will be spaced from the sprocket 34 and accordingly will not interfere with the rotation of the sprocket 34. However, when the probe 90 is extended, the finger 92 will extend into the sprocket and engage a suitable detent 93 on the sprocket 34. The detents 93 may include a series of recesses in the sprocket 34 with radial faces on the ends thereof. These ends are positioned to engage the flat side of the finger 92 when it is extended and the ends are disposed at substantially uniformly spaced intervals which are precisely related to the position of the spokes 68. As a consequence, each time the finger engages one of the detents and the sprocket 34 stops rotating, the spokes 68 will be retained in a predetermined fixed position. This, in turn, will be effective to stop the film strip 14 with the frames 18 always being disposed in precisely predetermined positions. As will become apparent subsequently, one edge of the opening defining the end or terminal frame of the film is preferably disposed in substantial alignment with the end of the bottom guide member 72 each time that the probe 90 is extended to stop the sprocket 34.

One means of controlling the motion of the probe 90 is a cam follower 94 that engages the profile of the cam 82. The present follower 94 which is in the form of a roller is disposed near the center of the probe 90 so as to engage this follower, or cam 82 on the side opposite from the sprocket 34. As a result, the cam 82 will be effective to retract the probe 90 away from the sprocket 34. A spring 96 may be provided which is operatively interconnected with the probe 90 so as to resiliently bias it into the extended position. This in turn will insure the follower 94 being positively maintained against the surface of the cam 82 and the probe 90 extended at the low point in the cam.

Another means of controlling the motion of the probe 90 is a solenoid 98. The end of the probe 90 may be slidably disposed inside of the solenoid 98 so that it can slide therethrough. When the solenoid 98 is de-energized, the spring 96 will be effective to force the probe 90 towards the extended position, and maintain the follower 94 riding on the cam 82. Thus as long as the solenoid 98 is not energized, the cam 82 will be effective to control the position of the probe 90 as it is retracted and extended. Accordingly it may be seen that each time the cam 82 rotates it will extend the probe 90 and periodically stop the sprocket 34 for a moment. At the same time the film strip will be stopped from sliding through the guide. However, when the solenoid is energized it will be effective to pull the probe 90 axially inwardly through the solenoid 98 and compress the spring 96. This will lift the follower 94 from the cam 82 and continuously maintain the probe 90 in the fully retracted position at all times. Therefore, as long as the solenoid 98 is energized the sprocket 34 can rotate continuously.

The cutter mechanism 36 for cutting the film strip 14 into the individual cards 16 includes a cutting head 100 which is mounted adjacent the end of the guide 70 and above the magazine 38 so that the film 14 will pass thereunder as it emerges from the guide 70. The cutting head 100 is mounted on a pair of parallel guides 102. The guides 102 are in turn slidably disposed in a pair of parallel bushings which may be pressed into the frame 42. This will permit the head 100 to move up and down parallel to the guides 70. When the cutting head 100 is raised, the film may emerge from the film guide and freely pass under the head 100. However, when the head 100 is lowered, a portion 104 of it will engage the terminal frame 18 on the film strip 14.

Figure 1:
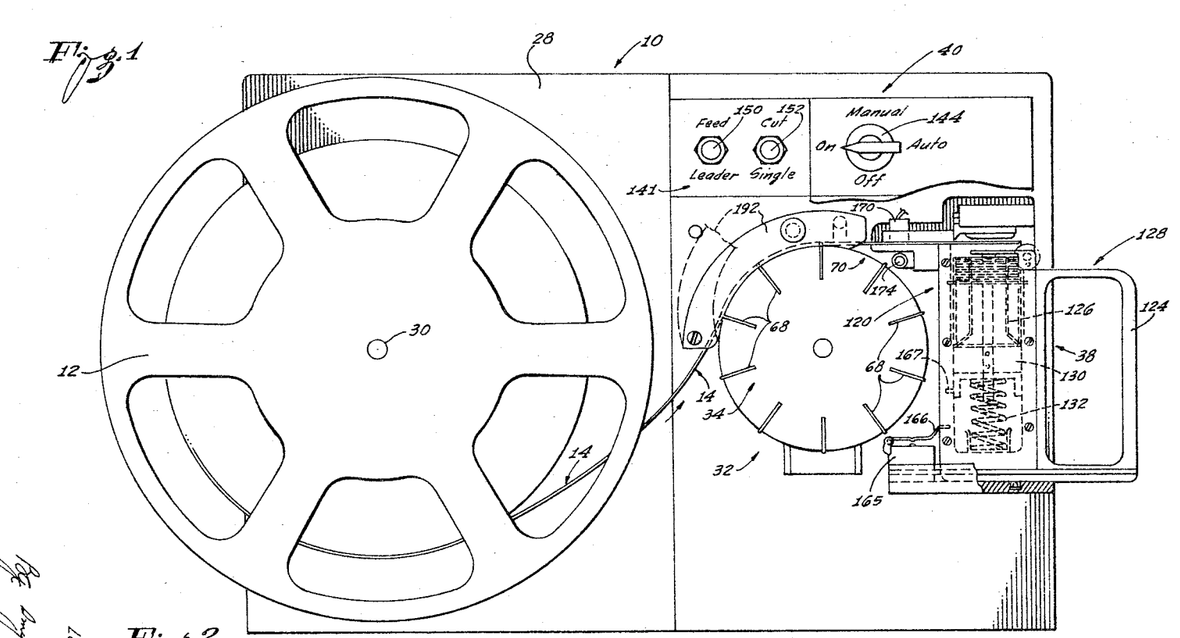
FIGURE 1 is a frontal elevational view of a film cutter and stacker embodying the present invention.
Figure 2:
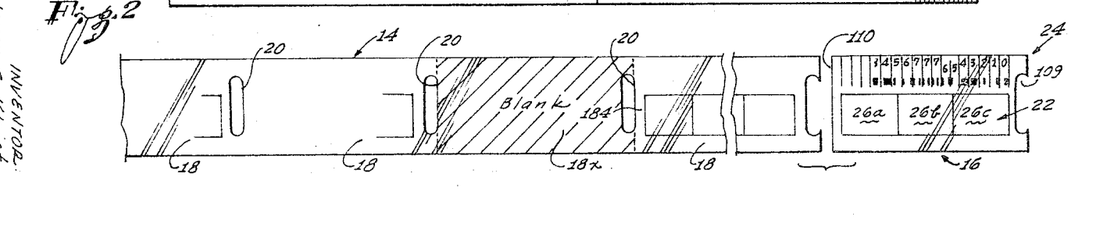
FIGURE 2 is a view of a film strip to be processed by the machine and a film card cut therefrom.

A cutting blade 106 may be provided on the edge of the head 100 so as to be immediately adjacent to the end 108 of the lower guide member 72. This cutting edge or blade 106 and the end 108 of the lower guide member are arranged to act as a shears to cut the film along a line substantially coincident with the end 108 of lower guide member 72 when the cutting head 100 descends. The finger 92 on the end of the probe 90 and the detents on the sprocket 34 are so positioned that when the sprocket 34 is momentarily stopped the edge of the opening 20 defining the end of the terminal frame 18 on the film strip 14 is positioned in substantial alignment with the end 108 of the guide member 72. This will cause the blade 106 to cut the film 14 substantially coincident with one edge of the opening 20. As may be seen in FIGURE 2, each time the terminal frame 18 is cut from the film strip 14 by the descending blade 106, the resultant card 16 will have a notch 109 on one end. The other end 110 of the card 16 will be substantially straight.

To drive the cutting head 100 vertically through its stroke, a lever 112 is pivotably mounted on the frame 42 so that one end bears against the cutting head 100. A push rod 114 is slidably disposed in a bushing formed by the frame 42 so that the upper end of the push rod 114 bears against the end of the lever 112. The lower end of this push rod 114 is positioned to ride on the surface of the cutter cam 86 and be moved vertically in accordance with the profile of the cam 86. The cam profile has an extended portion that will permit the cutting head 100 to normally be maintained in an elevated position. However, a raised portion or nose is provided that will raise the push rod 114 and cause the cutting head 100 to be descend. One or more springs 116 may be provided on the guides 102 which will be effective to bias the cutter head 100 upwardly against the end of the lever 112. This in turn will force the opposite end of the lever downwardly against the push rod 114 and maintain the push rod 114 in intimate engagement with the surface of the cam 86.

It may thus be seen if the motor 44 is running and the clutch 78 is not slipping, the shaft 52 and cams 82 and 86 will be rotating. At the same time the shaft 62 will drive the sprocket 34 and advance the film 14 through the film guide 70. Periodically the cam 82 will force the probe 90 outwardly until the finger 92 engages the sprocket 34 and momentarily locks it in a fixed position. This will stop film 14 advancing through the film guide with the terminal frame 18 extending beyond the end of the guide 70. Preferably the edge of the perforation will be in substantial alignment with the end of the film guide. The cam 86 will then raise the push rod 114 and force the cutting head 100 downwardly so that the blade 106 will cut a card 16 from the film along a line substantially coincident with the edge of the perforation 70.

Each time the cutting head 100 descends, the cutting edge 106 will cut the terminal frame from the film strip to form a film card 16. At the same time the portion 104 will engage the card 16 and force it to move downwardly into a suitable container 120. Although this container may be of any desired variety, in the present instance it is similar to that disclosed in copending application. More particularly the container 120 includes a magazine 122 that may be temporarily secured to the front panel or removed by pushing it into position or pulling it therefrom by putting on the handle 124. A capsule 126 may be disposed inside of the magazine 122 so as to position an open end of the capsule 126 immediately below the portion 104. This will permit the portion 104 to engage the cards 12 as they are cut and force them through the opening 128 and into the capsule 126. A plunger 130 may be disposed inside of the capsule 126 so that the cards in the capsule will form a stack that is disposed on top of the plunger 120. A spring 132 biases the plunger 130 and the stack of cards 16 thereon upwardly toward the opening 128.

In order to stop the foregoing cutting operation, the stop cam 84 may be provided on the shaft 52. A pawl 136 is mounted in a bushing on the frame 42 so that the end of the pawl 136 may ride against the profile of the cam 84. The profile may be substantially cylindrical except for an enlarged radial face 138 that will engage the end of the pawl 136. This will be effective to lock the shaft 52 against any further rotation. However, the slipping clutch 78 will still permit the motor 44 and auxiliary shafts 58 and 60 to continue to rotate. The cams 84 are oriented with respect to the face 138 so that the probe 90 will be extended to lock the sprocket 34 and so that the push rod 114 will be lowered to raise the cutter head 100 when the pawl 136 engages the face 138. A spring 140 may be provided that is effective to bias the pawl 136 into engagement with the cam 84. A solenoid 142 may be disposed around the end of the pawl. When energized the solenoid 142 will pull the pawl 136 against the spring 140 so that the end thereof will clear the radial face 138 and allow the shaft 52 to freely rotate.

Figure 7:
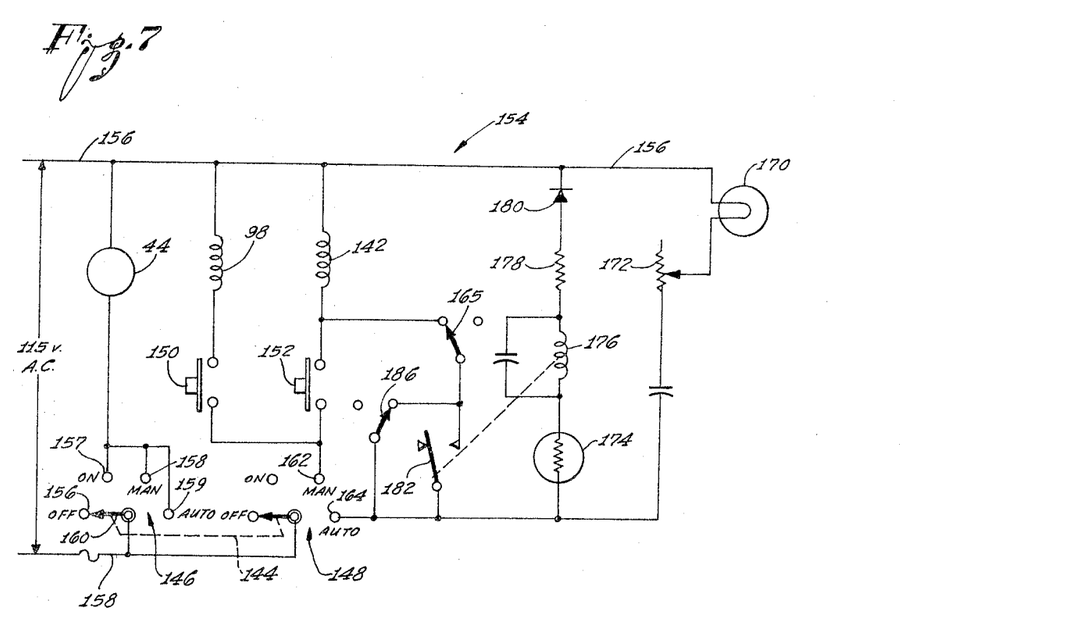
FIGURE 7 is a wiring diagram of an electrical circuit for controlling the operation of the drive mechanism in the film cutter and stacker.

The section 40 for controlling the operation of the machine includes a control panel 141 that is disposed immediately above the film transport 32 and the cutting head 100. The panel 142 includes a control or mode selector switch 144 which is effective to turn the machine 10 "ON" and "OFF" and to select the mode in which it will operate. This switch 144 may include two banks, 146 and 188 of contacts and may include four positions, i.e., OFF, ON, MANUAL and AUTOMATIC. In addition the control panel 142 may include a feed switch 150 and a single cut switch 152. These switches 144, 150 and 152 may be interconnected with each other, the motor 44 and the solenoids 98 and 142 by means of a circuit 154 similar to that shown by the wiring diagram in FIGURE 7.

More particularly, this circuit 154 includes a pair of supply lines 156 and 158 which are adapted to be interconnected with a suitable power source such as a standard 115 volt power line. The drive motor 44 may have one side thereof connected directly to the supply line 156. The other side of the motor 44 is connected to the other supply line 158 by one bank 146 of the mode selector switch 144. This bank 146 includes four fixed contacts 156, 157, 158 and 159 and one movable contact 160, which is effective to engage only one of the fixed contacts, 156 to 159 at a time. When the switch 144 is in the OFF position, the contact 160 will engage the contact 156 and no power will be supplied to the motor 44. The remaining contacts 157, 158 and 159 are all connected to the motor 44; thus, if the switch 144 is in the ON position, the MANUAL position, or the AUTOMATIC position, the opposite side of the motor 44 will be connected to the second supply line 158. Thus, the motor 44 will be continuously energized and running whenever the mode switch 144 is not in the OFF position.

The solenoid 142 for controlling the position of the probe 90 may have one side thereof connected directly to the supply line 156, while the opposite side is connected to the feed leader switch 150. This switch 150 is in turn interconnected with the MANUAL contact 162 in the second bank 148 of the mode selector switch 144. Thus, in the event the mode selector switch 148 is in the MANUAL position, closing the feed switch 150 will energize the solenoid 98 and retract the probe 90 and withdraw the finger 92 out of the sprocket 34. The probe 90 will remain in this retracted position as long as the feed switch 150 is depressed and the selector switch 144 is in the MANUAL position. While the probe 90 is retained fully retracted by the solenoid 98 the cam 82 will have no effect on the position of the probe 90. As a consequence the sprocket 34 will be free to rotate continuously and feed film through the film guide 70.

The second solenoid 142 for controlling the cutting mechanism has one side inter-connected with the power line 156. The other side connects with the cutter switch 152 which in turn is connected with the MANUAL contact 162 in the mode switch 144. In the event the mode switch 144 is in the MANUAL position, the solenoid 142 will not be energized unless the switch 152 is manually closed. As a consequence the spring 140 will force the pawl 136 outwardly against the cam 84. Thus when the cam 84 rotates around the face 138 will eventually engage the end of the pawl 136 and be prevented from turning further. This in turn will stop the shaft 52 rotating and retain the cutting head 100 elevated and the sprocket 34 stopped. However, when the single cut switch 152 is closed to energize the solenoid 142 the pawl 136 will be retracted and permit the cutter to operate.

It will thus be seen that when the mode switch 144 is in the MANUAL position, the operator may depress the feed leader switch 150 and cause the film strip 14 to be continuously fed through the guide 70 and past the top of the container 120 without cutting the film 14. After the film strip 14 has been fed to a point where it is desired to cut a card 16 therefrom, the single cut switch 152 may be closed. This will cause the cutter to complete a stroke and cut a card 16 from the film strip 14.

The second side of the cutter solenoid 142 may also be connected directly to the AUTOMATIC contact 164 in the mode selector switch 144. If this is done, when the mode selector switch 144 is in the AUTOMATIC position, the first solenoid 98 will never be energized and probe 90 will not be retracted thereby. Thus the running of the sprocket 34 will be controlled entirely by the action of the probe 90 as the cam 82 causes it to be moved back and forth. At the same time the second solenoid 142 may be continuously energized and will retain the pawl 136 in its retracted position and clear of the stop cam 84. Thus the film 14 will be continuously fed through the cutter mechanism and chopped into cards 16 and simultaneously stacked in the storage capsule 126. Although this may be acceptable for many purposes, it has been found desirable to modify this mode of operation by providing additional controls over the solenoid 142.

For example, it is desirable to stop the operation of the cutter when the capsule 126 contains a full stack of cards. To accomplish this a hopper-full switch 165 may be electrically inter-connected in series with the stop solenoid 142. This switch 165 is physically mounted on the front of the cutter adjacent to the container 120 so that an arm 166 is positioned to be engaged by the descending plunger 130 in the capsule 126, or an arm 167 that moves therewith. When the capsule 126 contains a complete stack of cards 16 the arm 166 will be engaged by the plunger 130 and the switch 165 opened. This will disconnect the stop solenoid 142 from the AUTOMATIC contact 164. This will de-energize the solenoid 142 and allow the pawl 136 to engage the face on the cam 84. This will stop the drive shaft 52 and thereby stop the cutting head 100 being stroked or the sprocket 34 rotating.

It has also been found desirable to provide means 168 for detecting the presence of defective frames or detecting marker frames in the film strip and in the event of the occurrence of such a frame stopping the cutter 10 from processing any further film. Although there are numerous means for scanning the film to detect such frames such as frame 18x, in the present instance, it is accomplished by employing photoelectrical means 168. More particularly, a small lamp 170 may be mounted on one of the guide members 74. This lamp may be connected between the power line 156 and the AUTOMATIC contact 164 so as to be continuously energized when said switch 144 is in the AUTOMATIC position. A rheostat 172 may be provided for controlling the intensity of the light. The lamp 170 directs a fine or narrow beam of light through the film 14. Preferably the lamp is positioned to direct the beam of light through a particular portion of a frame when the film momentarily stops. For example, the beam may be directed through one of the areas such as 26a. This area will contain an image of a document and will be highly transparent if the frame is properly exposed. If the frame is not properly exposed it will not contain an image and will be substantially opaque.

The photocell 174 is mounted on the guide member 72 on the opposite side of the film 14. The photocell 174 may be of the photoresistive variety, i.e., it will change its resistance as a function of the light intensity incident thereon. The photocell 174 is disposed in substantial alignment with the lamp 170. Thus, if the frame 18x is completely opaque, i.e., has not been exposed, little or no light can pass therethrough and be incident on the photocell 174, and it will have a first resistance. However, if the film 14 has been properly exposed and contains an image, it will be substantially transparent. As a consequence, the photocell 174 will have a second resistive value. The photocell 174 may be connected between the AUTOMATIC contact 164 and the power line 156 by means of a solenoid 176 and a current limiting resistor 178 and a diode 180. This will thus cause a low current to flow through the solenoid when the photocell has a high resistance and a high current to flow when it has low resistance. The various parameters including the setting of the rheostat 172 are chosen so that the low current is too small to fully energize the solenoid 176 while the high current is large enough to actuate the solenoid 176. The solenoid 176 will thus be energized or not energized as a function of whether a large or small amount of light is passing through the area of the frame.

The solenoid 176 is effective to actuate or open and close a switch 182 that is electrically disposed in series with the full switch 165. When this switch 182 is closed it will be possible to energize the solenoid 142 via the AUTOMATIC contact 164. However, with the switch 182 it may be effective to de-energize the solenoid 142 and thereby stop the operation of the entire machine 10.

When the photocell 174 does not have light incident thereon, i.e., a defective or unexposed frame 18 is disposed between the lamp 170 and the photocell 174 the switch 182 will open. When the photocell 174 does have light incident thereon as occurs with a properly exposed frame 18 in the guide, the switch will remain closed.

It has been found that as the film progresses through the guide 70 and between the lamp 170 and photo cell 174 it may contain dark or unexposed portions. For example, a black border 184 may be present around and between the frames 18. Since these will black the light and prevent its reaching the photocell 174 as the film passes through the guide, it may cause the solenoid 176 to be de-energized sufficiently long for the switch 182 to open. This would have the same effect as a defective frame and would stop the operation of the machine. In order to prevent this happening a second switch 186 may be disposed in parallel to the first. This switch 186 is mounted on the frame 42 adjacent the end of the drive shaft assembly and includes an arm 188 that rides on a cam 190.

The major portion of the cam 190 profile is such that the switch 186 will normally be closed. However, it has a small portion that is slightly raised to cause the switch 186 to momentarily open. The angular orientation of this portion relative to the other cams is such that the switch will only open when the cam 82 extends the probe 90 to stop the sprocket 34. It may thus be seen that the only time that the switch 182 can have any control over the solenoid 142 is during the instant the sprocket 34 is locked in a fixed position and the film strip 14 has stopped and positioned the terminal frame adjacent the cutter. As a consequence, a particular part of the frame will be aligned with the photocell. By way of example it may be the area 26a of the data section 22 cell. If this area is properly exposed the switch 182 will remain closed. Thus the solenoid 142 will remain energized and the machine may continue to operate and feed the film through the cutter. However, in the event a frame 18x that has not been exposed is disposed in front of the photocell the amount of light incident on that photocell 174 will change sufficiently to cause the switch 182 to open. This in turn will de-energize the solenoid 142 and release the pawl 136, which in turn will energize the face 138 on cam 84 and stop the operation of the machine.

In order to employ the present machine a reel 12 of exposed film 14 may first be mounted on the shaft 30. The end of the film 14 for example a leader section is then layed around the sprocket 34 and at least partially inserted into the end of the guide 70. An arm 192 may then be lowered to keep the film retained on the sprocket 34. Normally the initial portion of the film will be a leader that does not have any data recorded thereon. In order to remove this leader for discarding, the mode switch 144 is placed in the MANUAL position and the feed leader switch 150 manually closed. This will energize the solenoid 98 and move the probe 90 into its retracted position. The sprocket 34 will then be free to rotate and strip film from the reel 12. The film will then be fed through the guide 70 and across the opening in the top of the capsule 126. Since the solenoid 142 is not energized the pawl 136 will be in engagement with the face 138. As a consequence the cutter 100 will remain elevated and the uncut film will travel across the top of container 120. This may be continued until the desired portion of the film is reached. At this point the operator may allow the feed switch 150 to open. If it is desired to cut the film the operator may then close the cut switch 152. This will energize the solenoid 142 and withdraw the pawl 136 and release the cam 84. The shaft 52 will then rotate and allow the cam 86 to drive the cutter 100 and cut the film 14. This operation may be employed to merely cut the leader from the film strip or it may be continued to individually cut the separate cards 16 from the film strip.

After the film is properly positioned to be cut into cards 16 and stacked in the container 120, the mode selector switch 144 may be moved to the AUTOMATIC position. This will de-energize the solenoid 98. The probe 90 will thus be released and the spring 96 will maintain the follower 94 against the cam 82. As a consequence, the probe 90 will now be periodically extended into and out of engagement with the detents on the sprocket 34. The sprocket 34 will thus be allowed to intermittently rotate through an arc equal to the space between the spikes or teeth 68. This in turn will cause the film strip 14 to be stepped through the guide 70. Each step is equal to the length of a frame 18. When the film is momentarily stopped the aperture 20 will have one edge thereof in substantial alignment with the end of the guide 70.

At the same time the solenoid 142 will be energized if the full switch 165 is closed and the switch 186 or switch 182 is closed. This will retract the pawl 136 from the cam 84 and the cam 86 will be free to rotate. This will cause the push rod 114 to rise and fall each stroke of the cutting head 100. Each time the film is advanced the head 100 will be raised so that the terminal frame 18 on the strip 14 will move between the head 100 and the opening on the top of the container 120. Each time the film is momentarily stopped, the head 100 will descend. The cutting edge 100 will then cut a card 16 from the film strip 14 and force it through the opening in the top of the container 120 onto the top of the stack.

This process will continue until such time as the switch 165 opens or both of the switches 182 and 186 open. The switch 165 is positioned so that the arm 166 will not be engaged by the arm 167 on the plunger 130 and will remain closed. However, as the machine 10 is run for an extended time and cuts a large quantity of film, the stack of cards 16 will gradually become approximately equal to the height of the capsule 126. This will force the plunger down until the arm 167 hits the arm 166. This will in turn open the switch 165 and de-energize the solenoid 142. The pawl 136 will then be released so as to engage the cam 84 and stop the machine solenoid. The container 120 may then be removed and replaced with another container that is empty.

As the film is moving through the machine 10, the cam 88 will maintain the switch 186 closed. As a consequence even though the switch 182 may momentarily open, the solenoid 142 will remain energized and the machine 10 will continue to run. However, during the interval when the probe 90 is momentarily extended and the sprocket 34 is stopped, the cam 88 will allow the switch 186 to open. At this time the light 170 from the lamp will be passed through a particular portion of the document section and onto the photocell 174. If the document area is properly exposed, the solenoid 176 will be energized to a sufficient extent to maintain the switch 182 closed. This will keep the solenoid 142 energized and pawl 136 retracted. The shaft 52 and cam 88 will continue to rotate so as to again close the switch 186 whereby the next frame 18 will be advanced into position for cutting. However, if the frame 18x is aligned with the photocell 174, the light will be blocked from the cell 174. This will cause the switch 182 to open during the interval the cam 88 opens the switch 186. As a consequence, the solenoid 142 will release the pawl and stop the machine.

Normally, when the cards 16 are being cut from the film strip it is desirable to group the cards so that all of the cards 16 in a given capsule 126 will be related. It is also desirable for the number of cards 16 in the capsule 126 to be limited to a precise number, for example, one hundred. To facilitate such a grouping during the photographing of the documents every hundred exposures or whatever maximum number of cards are to be placed in a capsule the next frame may not be exposed to produce a blank frame 18x. Also, when a group of documents have been recorded, before commencing to record the next group a blank from 18x may be provided. When the machine reaches this frame 18x, the photoelectric cell will sense the blank frame 18x. The photocell will cause the solenoid 142 to release the pawl and stop the machine even though the hopper-full switch 165 has not been opened. The operator may then replace the loaded capsule with a fresh or unloaded capsule and restart the machine.

It may thus be seen that a machine has been provided that will be effective to cut the various frames from a strip of film and to stack the resultant film cards. Although only a single embodiment of the present invention has been disclosed and described herein, it will be readily apparent to those skilled in the art that numerous changes and modifications may be made without departing from the spirit of the invention. Accordingly, the foregoing drawings and description thereof are for illustrative purposes only and do not in any way limit the invention which is defined only by the claims which follow.

What is claimed is:

1. In combination for cutting a strip of film into a plurality of film cards,
   means for advancing the film strip,
   stop means operatively coupled to the advancing means for momentarily interrupting the advance of the film strip each time it has been advanced through a predetermined increment,
   cutting means operatively coupled to the film strip and positioned for engaging and cutting the film into film cards,
   means disposed adjacent said film strip for inspecting said film strip for defects, said last means being operatively interconnected with said stop means for stopping the advance of said film strip whenever it is defective,
   and means operatively coupled to said film-advancing and stop means for obtaining the effective operation of said film-inspecting means only when the advance of the film strip has been momentarily interrupted by the stop means.

2. In combination for cutting a strip of film having a series of frames into a plurality of film cards with each card containing one of said frames,
   a film guide for allowing said film to move therethrough and emerge from one end,
   feed means for intermittently advancing said film through said guide in increments substantially equal to the length of a frame and periodically positioning the terminal frame on said film strip adjacent the end of said guide,
   a cutting head disposed adjacent said end of said guide and including a cutting edge for cutting said film strip along one edge of said terminal frame when said film is momentarily stopped to cut a film card therefrom,
   means mounted on said film guide adjacent said film strip for inspecting said film strip for defects, said means being operatively interconnected with said feed means and effective to disable the feed means whenever one of said frames is not properly exposed,
   and means operatively coupled to the feed means for obtaining an effective operation of the inspecting means only during the momentary stopping of the film.

3. In combination for use with
   a strip of film having a series of frames for containing photographic images of documents, each of the said frames that are properly exposed to a document containing an image of the document and having a first amount of transparency, each of the frames that are not properly exposed to a document having a second transparency,
   a film guide for receiving said strip of film and allowing said film strip to travel therethrough,
   feed means for intermittently advancing said film strip through said guide and momentarily stopping the movement of the film strip through said guide each time the film strip advances a distance substantially equal to the length of one frame,
   a cutting head disposed adjacent said film guide and including a cutting blade positioned to register with the space between a pair of adjacent frames whenever said film strip stops and to cut a film card from said film strip containing said terminal card,
   means disposed immediately adjacent said film strip and responsive to the transparency of said frames, said means being effective to disable said feed means and prevent the further advance of said film whenever one of the frames has said second transparency,
   and means operatively coupled to the feed means for obtaining a disabling of the feed means by the transparency means only during the time that the film advance has been momentarily stopped by the feed means.

4. In combination for use with
   a strip of film having a series of frames for containing photographic images of documents, each of said frames that are properly exposed to a document containing an image thereof having a first amount of transparency, each of said frames that are not properly exposed to a document having a second transparency,
   means for advancing the film strip,
   receiving means having an opening disposed relative to the advancing means to receive cards cut from the strip of the film, stop means operatively coupled to the advancing means for obtaining a momentary interruption in the movement of the film strip upon each advance of the film strip through an increment of length substantially equal to the length of a card, cutting means disposed adjacent to the opening in the receiving means and operatively coupled to the stop means for engaging the film strip and for cutting the film into said cards and for moving the film card into said receiving means, means including a photo electric cell disposed adjacent said film strip and responsive to the transparency of said film, said photo electric cell means being electrically interconnected with said stop means for disabling said advancing means each time that a frame has said second transparency, and means operatively coupled to the stop means for obtaining a disabling of said advancing means by said photoelectric cell means only during the time that the movement of the film strip is momentarily interrupted by the stop means.

5. In combination for use with a strip of film having a series of frames for containing photographic images of documents, each of the frames that are properly exposed to a document containing an image thereof having a first amount of transparency, each of said frames that are not properly exposed to a document having a second transparency, a film guide for receiving said strip and allowing said film strip to pass therethrough, feed means operatively interconnected with said film strip for intermittently advancing the film strip through the film guide, stop means for obtaining an interruption in the advance of the film strip each time the film moves through an increment substantially equal to the length of a frame to position the terminal frame of said strip adjacent the end of said guide, cutting means dipsosed in contiguous relationship to the film strip and operatively coupled to the feed means for advancing toward the film to cut said terminal frame from said strip to form a card, first switching means connected in a circuit with the feed means to obtain the operation of the feed means, photo electric means disposed on said guide means and electrically interconnected with said first switching means, said photo electric means being responsive to the transparency of said frames and effective whenever a frame has said second transparency to operate upon said first switching means for disabling said feed means, and second switching means connected in a circuit with the feed means to override the first switching means for insuring the operation of the feed means during the periods between the operation of the stop means.

6. Means for cutting a strip of film having a series of frames into a plurality of film cards with each card containing a frame, said means including, a film guide for receiving said strip of film and allowing said film strip to travel therethrough, feed means for advancing said film strip through said guide and momentarily stopping the advance of the film strip through said guide each time the film strip advances the length of one frame, a cutting head disposed adjacent said film guide and including a cutting blade positioned to engage and cut said film into film cards, means operatively coupled to said feed means for actuating said cutting head to cut said film strip in the space between a pair of adjacent frames each time said film strip momentarily stops, first switching means having first and second states of operation and connected in a circuit with the feed means to obtain an operation of the feed means in the first state and to disable the feed means in the second state, the first switching means being normally operative in the first state, means disposed upon said film guide for inspecting said film as it passes through the said film guide, said last means being operatively interconnected with said first switching means for obtaining an operation of the first switching means in the second state whenever said film is defective, and second switching means having first and second states of operation and connected in a circuit with the feed means to obtain an operation of the feed means in the first state and to disable the feed means in the second state, the second switching means being normally operative in the first state and being operatively coupled to the feed means to obtain an operation of the switching means in the second state every time that the advance of the film strip is momentarily stopped.

7. Apparatus for cutting a strip of film having a series of frames into a plurality of film cards with each card containing a frame, including, a film guide having a passage for receiving said strip of film and allowing said film strip to travel therethrough, feed means operatively interconnected with said film strip for advancing said strip through said guide and momentarily stopping its advance each time the film strip advances the length of one frame, a cutting head disposed adjacent said film guide, a cutting blade mounted on said head and positioned to register with the space between a pair of adjacent frames whenever said film strip stops and to cut a film card from said film strip each time said cutting head completes a stroke, drive means operatively coupled to said feed means for actuating said cutting head through a complete stroke towards and away from said film strip during the time said film strip momentarily stops advancing to cut the terminal frame from strip, means disposed upon said film guide for inspecting at least a portion of one of the frames disposed in said guide during the moment that the film strip is stopped, first switching means operatively coupled to said inspecting means and connected in an electrical circuit with the feed means for obtaining a stopping in the advance of said film if the inspected frame is defective, second switching means operatively coupled to said feed means and connected in an electrical circuit with said feed means for rendering the first switching means effective in obtaining a stopping in the advance of the film only during the time that the advance of the film strip is momentarily stopped.

8. Apparatus for cutting a strip of film having a series of frames into a plurality of film cards with each card containing a frame and for stacking said cards, said frames when properly exposed having a first transparency and when not properly exposed having a second transparency, said apparatus including, a film guide having a passage for receiving said strip of film and allowing said strip to travel therethrough and emerge from one end of said guide, feed means for intermittently advancing the strip of film through said film guide and beyond said end in increments substantially equal to the length of a frame to thereby momentarily position the terminal frame on said film strip adjacent said end of said guide, a cutting head disposed adjacent said end of said guide and having a cutting edge to engage said film strip along the inner end of said terminal frame for cutting a film card from said strip when said film momentarily stops, first switching means having first and second states of operation and normally operative in the first state and connected in a circuit with the feed means to enable the feed means in the first state and to disable the feed means in the second state, light sensitive means disposed upon film guide adjacent one side of said film strip and operatively interconnected with said feed means, means disposed on the opposite side of said strip for directing a beam of light through said film and onto said light sensitive means, said last means being operatively coupled to said first switching means to obtain the second state of operation in the feed means and to stop said feed means advancing said film strip whenever one of said frames has said second transparency, second switching means having first and second states of operation and normally operative in the first state and connected in a circuit with the feed means to enable the feed means in the first state and override the first switching means and to provide a control by the first switching means in the second state in accordance with the operation of the first switching means in the first and second states, the second switching means being operatively coupled to the feed means to become operative in the second state upon each interruption in the intermittent advance of the feed means.

9. In combination for use with a strip of film having a series of frames for containing photographic images of documents, each of the frames properly exposed to a document having a first transparency and each of the frames not properly exposed having a second transparency, a film guide for receiving said strip of film and allowing said strip to travel therethrough and emerge from one end of said guide, feed means for intermittently advancing the strip of film through said film guide and beyond said end, stop means operatively coupled to the feed means and effective to momentarily stop the advance of the film strip each time said film strip moves a distance substantially equal to the length of a frame to momentarily position the terminal frame on said film strip adjacent said end of said guide, receiving means disposed adjacent the end of said film guide and having an opening therein substantially the same size as a card and in substantial alignment with the terminal frame when said film strip is momentarily stopped, a cutting head disposed adjacent said end of said guide for cutting the terminal frame from said strip to produce a film card and forcing said card through said opening and into said receiving means, means mounted on said film guide adjacent said strip of film and responsive to the transparency of a frame disposed in said guide, said last means being effective to disable said feed means whenever said frame has said second amount of transparency, and means operatively coupled to the stop means for obtaining an operation of the last mentioned means in disabling the feed means only when the advance of the film strip by the feed means has been momentarily interrupted.

10. In combination for cutting a strip of film into a plurality of film cards, means for intermittently advancing the film strip, stop means operatively coupled to the advancing means for momentarily interrupting the advance of the film strip each time it has been advanced through a predetermined increment, cutting means operatively coupled to the film strip and positioned for engaging and cutting the film into film cards, and light sensitive means disposed adjacent said film strip and responsive to the amount of light passing through said film strip for defects, means interconnecting said light sensitive means with said stop means for stopping the advance of said film strip whenever the amount of light passing through said film is equal to that from an improper exposure, and means operatively interconnected with said last mentioned means for disabling said last mentioned means when said film strip is moving.

11. In combination for cutting a strip of film into a plurality of film cards, means for intermittently advancing the film strip, stop means operatively coupled to the advancing means for momentarily interrupting the advance of the film strip each time it has been advanced through a predetermined increment, cutting means operatively coupled to the film strip and positioned for engaging and cutting the film into film cards, and means disposed adjacent said film strip for inspecting said film strip for defects, means interconnecting said inspecting means with said stop means for stopping the advance of said film strip whenever said film strip is defective, and means operatively interconnected with said stop means and effective to permit said inspecting means to be operative only during the interval said film is momentarily stopped.

12. In a device of the class described for cutting a strip of film having a series of frames containing photographic images of documents into a plurality of film cards, the combination of:

a film guide for receiving said strip of film and allowing said strip to travel therethrough and emerge from one end of said guide, feed means for intermittently advancing the strip of film through said film guide and beyond said end, a film cutter disposed adjacent said guide for cutting a film card from said film strip each time it stops, drive means operatively interconnected with said feed means and said film cutter for obtaining an intermittent advance of said film strip by said cutter and for obtaining a cutting of said cards from the film strip by the cutter, a cutting head operatively coupled to said film cutter and to said drive means, said cutting head being effective when the film strip stops to advance said film cutter toward said film strip to cut said cards from the film strip, inspection means disposed on said guide adjacent said film strip, said inspection means being positioned to register with and inspect a particular portion of a frame in said guide each time said film is momentarily stopped and to produce a particular signal indicating that the portion of the film being inspected is defective, switch means operatively interconnected with said drive means and with said inspection means, said switch means being effective to intermittently disable said inspection means each time said film strip is moving and to periodically enable said inspection means each time said film strip is momentarily stopped, and means operatively interconnecting said inspection means with said drive means to obtain a disabling of said drive means when the inspection means produces the particular signal during the enabling of the drive means.

13. In combination for use with a strip of film having a series of frames for containing photographic images of documents, each of the frames that are properly exposed to a document containing a photographic image and having a first transparency and the frames not properly exposed to a document having a second transparency, a film guide for receiving said strip of film and allowing said strip to travel therethrough and emerge from one end of said guide, feed means for advancing the strip of film through said film guide and beyond said end, a cutting head disposed adjacent the end of said guide and having a cutting edge for engaging said film to cut a film card from said strip containing a frame, drive means operatively interconnected with said feed means, stop means operatively coupled to the drive means and effective to intermittently stop the advance of the film strip each time said film strip moves a distance equal to the length of a frame to thereby momentarily position the terminal frame on said strip adjacent said end of said guide, a cutting head drive operatively coupled to said cutting head and to said drive means and effective when the film strip stops to move said cutting head for cutting said card from the film strip, inspection means disposed on said guide adjacent said film strip, said means being positioned to register with a particular portion of a frame in said guide each time said film is momentarily stopped, said inspection means being responsive to the transparency of said particular parts to produce a particular signal when the transparency does not contain a photographic image, switch means operatively interconnected with said drive means and with said inspection means, said switch means being effective to disable said inspection means when said film is moving and to periodically enable said inspection means when said film is momentarily stopped, and means operatively interconnecting said inspection means with said drive means to obtain a disabling of said drive means by said inspection means when the inspection means produces the particular signal during the enabling of the drive means.

14. In combination for use with a strip of film having a series of frames for containing photographic images of documents, each of the frames properly exposed to a document having a first transparency and the frames not properly exposed having a second transparency, a film guide for receiving said strip of film and allowing said strip to travel therethrough and emerge from one end of said guide, feed means for advancing the strip of film through said film guide and beyond said end, a cutting head disposed adjacent the end of said guide and having a cutting edge for engaging said film to cut a film card from said strip containing a frame, drive means operatively interconnected with said feed means, stop means operatively coupled to the drive means and effective to intermittently stop the advance of the film strip each time said film strip moves a distance equal to the length of a frame to thereby momentarily position the terminal frame on said strip adjacent said end of said guide, a cutting head drive operatively coupled to said cutting head and to said drive means and effective when the film strip stops to move said cutting head for cutting said card from the film strip, light responsive means disposed on said guide adjacent said film strip to register with a particular portion of a frame in said guide each time said film is momentarily stopped, means for directing a beam of light through said portion and onto said light responsive means, said light responsive means being effective to produce a particular signal whenever said frame has said second transparency, switch means operatively interconnected with said drive means and with said inspection means to make said light responsive means effectively operative only when said film is momentarily stopped, and means operatively interconnecting said light responsive means with said drive means and effective to stop said drive means whenever said light responsive means produces said particular signal during the time that the light responsive means is effectively operative.

15. Apparatus for cutting a strip of film having a series of frames into a plurality of film cards with each card containing a frame and for stacking said cards, said apparatus including, a film guide for receiving said strip of film and allowing said strip to travel therethrough and emerge from one end of said guide, feed means for advancing the strip of film through said film guide and beyond said end, a cutting head disposed adjacent said end of said guide an having a cutting edge for engaging said film for cutting a film card from the said strip, drive means operatively coupled to the feed means and to the cutting means, said drive means being effective to normally stop the advance of the film strip momentarily each time said film strip moves a distance equal to the length of a frame, said drive means also being effective to move said cutting head toward and away from the film strip each time said film stops, a photocell disposed adjacent said film and responsive to the images thereon to provide a particular signal whenever the transparency of said image is not within particular limits, first switch means having first and second states of operation and normally operative in the first state operatively interconnected with said drive means in an electrical circuit to enable the drive means in the first state and interconnected with said photocell to become actuated to the second state upon the production of the particular signal by the photocell, and second switch means having first and second states of operation and normally operative in the first state and operatively interconnected with the drive means in an electrical circuit to enable the drive means in the first state, the second switch means being mechanically coupled to the drive means to become actuated to the second state each time that the advance of the film strip by the drive means becomes momentarily interrupted.

16. Apparatus for cutting a strip of film having a series of frames into a plurality of film cards with each card containing a frame and for stacking said cards, said apparatus including, a film guide for receiving said strip of film and allowing said strip to travel therethrough and emerge from one end of said guide, feed means for advancing the strip of film through said film guide and beyond said end, a cutting head disposed adjacent said end of said guide and having a cutting edge for engaging said film for cutting a film card from said strip, drive means operatively coupled to the feed means and to the cutting means, said drive means being effective to normally stop the advance of the film strip momentarily each time said film strip moves a distance equal to the length of a frame, said drive means also being effective to move said cutting head toward and away from the film strip each time said film stops to cut said film strip, a lamp disposed on one side of said film strip to direct a beam of light onto a particular portion of a frame when said film strip stops, a photocell disposed on the opposite side of said film in substantial alignment with said lamp to receive the light passing through said particular portion, said photocell being effective to provide a signal having characteristics dependent upon the transparency of said portion, first switch means electrically interconnected with said photocell and said drive means and having first and second states of operation and normally operative in the first state to enable the drive means and responsive to a particular signal from the photocell to become operative in the second state, and second switch means interconnected with said drive means and having first and second states of operation and normally operative in the first state to enable the drive means and operative to the second state each time that the advance of the film strip become momentarily stopped.

References Cited by the Examiner
UNITED STATES PATENTS

| | | | |
|---|---|---|---|
| 1,991,423 | 2/1935 | Shaver | 83—367 X |
| 2,797,753 | 7/1957 | Bornemann | 83—211 X |

WILLIAM W. DYER, Jr., *Primary Examiner.*

F. T. YOST, L. B. TAYLOR, *Assistant Examiners.*